(12) United States Patent
Guo et al.

(10) Patent No.: US 12,018,534 B1
(45) Date of Patent: Jun. 25, 2024

(54) DRILLING DEVICE FOR COAL MINING

(71) Applicant: SHANDONG UNIVERSITY OF SCIENCE AND TECHNOLOGY, Qingdao (CN)

(72) Inventors: Weiyao Guo, Qingdao (CN); Yueying Zhang, Qingdao (CN); Yongqiang Zhao, Qingdao (CN); Wenjing Guo, Qingdao (CN); Chengguo Zhang, Qingdao (CN); Xiangyu Wang, Qingdao (CN); Tongbin Zhao, Qingdao (CN); Yunliang Tan, Qingdao (CN)

(73) Assignee: SHANDONG UNIVERSITY OF SCIENCE AND TECHNOLOGY, Qingdao (CN)

( * ) Notice: Subject to any disclaimer, the term of this patent is extended or adjusted under 35 U.S.C. 154(b) by 0 days.

(21) Appl. No.: 18/403,435

(22) Filed: Jan. 3, 2024

(30) Foreign Application Priority Data

Aug. 16, 2023 (CN) .......................... 202311026975.7

(51) Int. Cl.
| | |
|---|---|
| *E21B 7/00* | (2006.01) |
| *E21B 3/02* | (2006.01) |
| *E21B 19/081* | (2006.01) |
| *E21B 21/01* | (2006.01) |

(Continued)

(52) U.S. Cl.
CPC .............. *E21B 19/081* (2013.01); *E21B 3/02* (2013.01); *E21B 21/011* (2020.05); *E21C 37/00* (2013.01); *E21C 41/18* (2013.01)

(58) Field of Classification Search
CPC . E21B 7/00; E21B 7/046; E21C 29/00; E21C 29/02; E21C 41/28
See application file for complete search history.

(56) References Cited

U.S. PATENT DOCUMENTS

| | | | | |
|---|---|---|---|---|
| 2,581,667 A | * | 1/1952 | Joy ......................... | E21C 37/10 175/323 |
| 3,721,471 A | * | 3/1973 | Bergmann ................ | F42D 3/04 299/13 |

(Continued)

FOREIGN PATENT DOCUMENTS

| | | |
|---|---|---|
| CN | 208686312 U | 4/2019 |
| CN | 113931575 A | 1/2022 |

(Continued)

*Primary Examiner* — Kipp C Wallace

(57) ABSTRACT

A drilling device for coal mining is provided, including a placement board. The placement board is fixedly connected to a first support pillar and a second support pillar, and the first support pillar and the second support pillar are together fixedly connected to a transmission rod; the transmission rod is connected to support rods symmetrically distributed in a limited sliding manner, and the support rods symmetrically distributed are connected to a connecting rod in a sliding manner; the connecting rod is provided with grooves evenly distributed in a circumferential direction, the grooves are fixedly connected to pneumatic telescopic blocks, and the telescopic end of each pneumatic telescopic block is fixedly connected to an arc-shaped plate. The arc-shaped plate is extended in a circumferential direction to support the drilled hole close to the drill bit, preventing the collapse of the drilling wall close to the drill bit.

8 Claims, 13 Drawing Sheets

(51) Int. Cl.
*E21C 37/00* (2006.01)
*E21C 41/18* (2006.01)

(56) References Cited

U.S. PATENT DOCUMENTS

| | | | | |
|---|---|---|---|---|
| 4,553,612 A | * | 11/1985 | Durham | E21B 7/201 |
| | | | | 175/203 |
| 2022/0010624 A1 | * | 1/2022 | Wan | E21B 19/161 |
| 2022/0010640 A1 | * | 1/2022 | Wan | E21B 25/08 |

FOREIGN PATENT DOCUMENTS

| | | |
|---|---|---|
| CN | 114320164 A | 4/2022 |
| CN | 115075724 A | 9/2022 |
| CN | 115265726 A | 11/2022 |
| CN | 115749858 A | 3/2023 |
| CN | 116446912 A | 7/2023 |
| WO | 2012065295 A1 | 5/2012 |

\* cited by examiner

DRILLING DEVICE FOR COAL MINING

CROSS-REFERENCE TO RELATED APPLICATIONS

This application claims priority to Chinese Application No. 202311026975.7, filed on Aug. 16, 2023, entitled "DRILLING DEVICE FOR COAL MINING". These contents are hereby incorporated by reference.

TECHNICAL FIELD

The present disclosure relates to the technical field of drilling equipment, in particular to a drilling device for coal mining.

BACKGROUND

During the process of mining and drilling construction in the coal mine, it is often necessary to use the drilling device to drill the working face or driving face, and charge and blast in the drilled hole. During the drilling process of existing drilling devices, there are differences in the depth required to drilled holes due to the varying thickness of coal and rock strata. When drilling deeper drilled holes, a drill rod often needs to extend a long distance, and it is prone to significant vibration due to the excessive extension of the drill pipe during the drilling process, especially the vibration amplitude near the drill bit is particularly strong, which can easily cause the hole wall of the drilled holes to collapse.

SUMMARY

The objective of the present disclosure is to provide a drilling device for coal mining to overcome the disadvantage of the hole wall being easily affected by the vibration of the drill bit to collapse.

In order to achieve the above objective, the technical solution adopted by the present disclosure is as follows:

A drilling device for coal mining, including a placement board, wherein the placement board is fixedly connected to a first support pillar and a second support pillar, the first support pillar and the second support pillar are together fixedly connected to a transmission rod, the transmission rod is connected to support rods symmetrically distributed in a limited sliding manner, the support rods symmetrically distributed are connected to a connecting rod in a sliding manner, a first cavity is set inside the connecting rod, the connecting rod is fixedly connected to a first gas pipe interconnected with the first cavity of the connecting rod, the connecting rod is rotationally connected to a drill rod, a second cavity set inside of the drill rod is interconnected with a high-pressure gas pipe, the first support pillar is fixedly connected to a second motor, an output shaft of the second motor is fixedly connected to a first lead screw that is rotationally connected to the first support pillar and the second support pillar, the first lead screw is threadedly connected to a rectangular connecting block fixedly connected to the connecting rod, the rectangular connecting block is fixedly connected to the first motor, an output shaft of the first motor is fixedly connected to the drill rod, the rectangular connecting block is connected to the drill rod in a limited rotating manner, the drill rod is fixedly connected and interconnected with a drill bit, the connecting rod is fixedly connected to arc-shaped blocks evenly distributed in a circumferential direction, the connecting rod is provided with grooves evenly distributed in a circumferential direction, a pneumatic telescopic block is fixedly connected to the grooves, the pneumatic telescopic block is interconnected with the first cavity of the connecting rod, a telescopic end of each pneumatic telescopic block is fixedly connected to an arc-shaped plate, the arc-shaped plate slides between adjacent arc-shaped blocks, and the connecting rod is provided with a blocking mechanism for drilling sealing.

The advantageous technical effects of the present disclosure are:

According to the present disclosure, the arc-shaped plate is extended in a circumferential direction to support the drilling close to the drill bit, preventing the prolonged working time and delayed production progress caused by the collapse of the drilling wall close to the drill bit due to excessive vibration amplitude of the drill bit.

By contacting the outer wall of the second gas bag with the inner wall of the drilled hole, the drilled hole is sealed to prevent the dust generated during the drilling process from leaking and affecting the respiratory system of the staff, and to prevent the dust explosion caused by the increase of dust concentration in the confined space after the leakage.

Through the inflation of the first air bag, the gap between the sealing inner ring and the support rods is filled, so as to prevent gas from leaking from the gap between the first seal housing and the support rods to threaten the safety of workers.

By misaligning the air outlet on the inner ring of the gas chamber with the air outlet of the outer ring of the gas chamber, the gas in the gas chamber is not transported to the first gas pipe and the second gas pipe, so that the drill bit stops rotating when it encounters the gas layer, preventing the gas explosion caused by temperature rise due to friction.

By providing the explosive filling cylinder, the explosives are separated from the wall of the blasting holes to prevent contact between the explosive and the wall of the blasting hole during the filling process, resulting in uneven filling of the explosive and failure to achieve the planned blasting effect.

Figure 1:
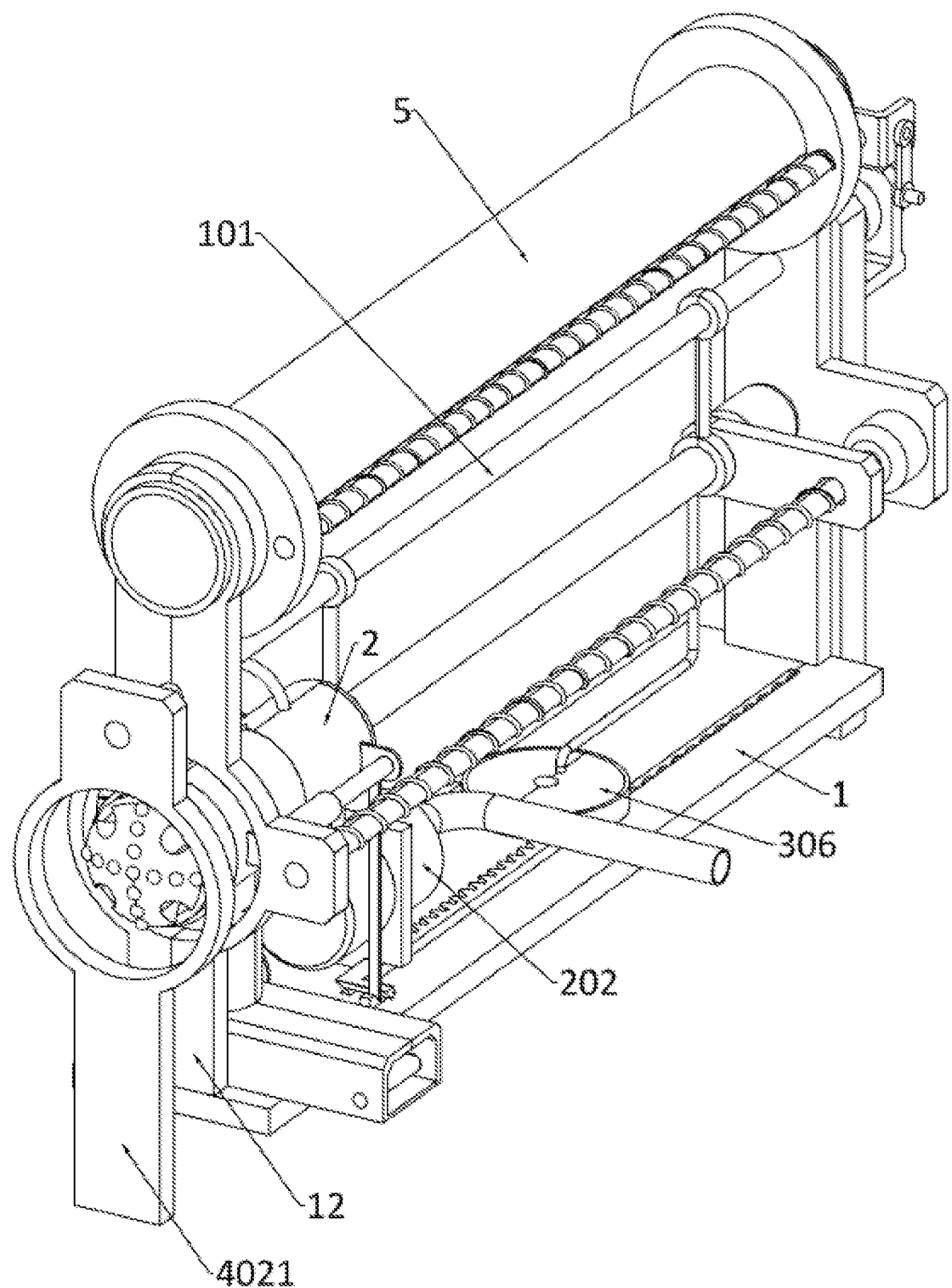
FIG. 1 is a schematic diagram of the three-dimensional structure of the present disclosure.
Figure 2:
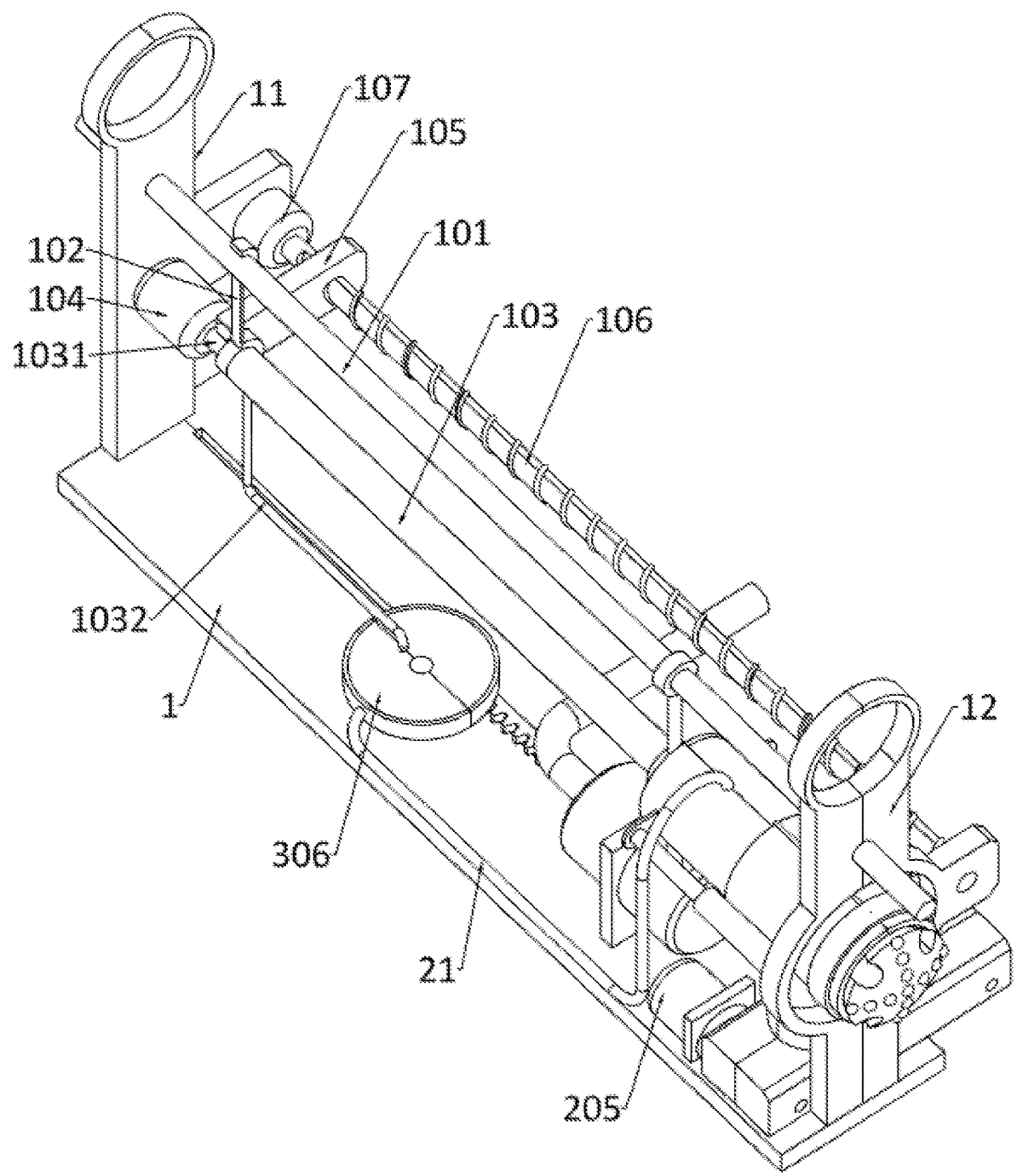
FIG. 2 is a schematic diagram of the three-dimensional structure of a placement board, a first support pillar, a second support pillar, and other components of the present disclosure.
Figure 3:
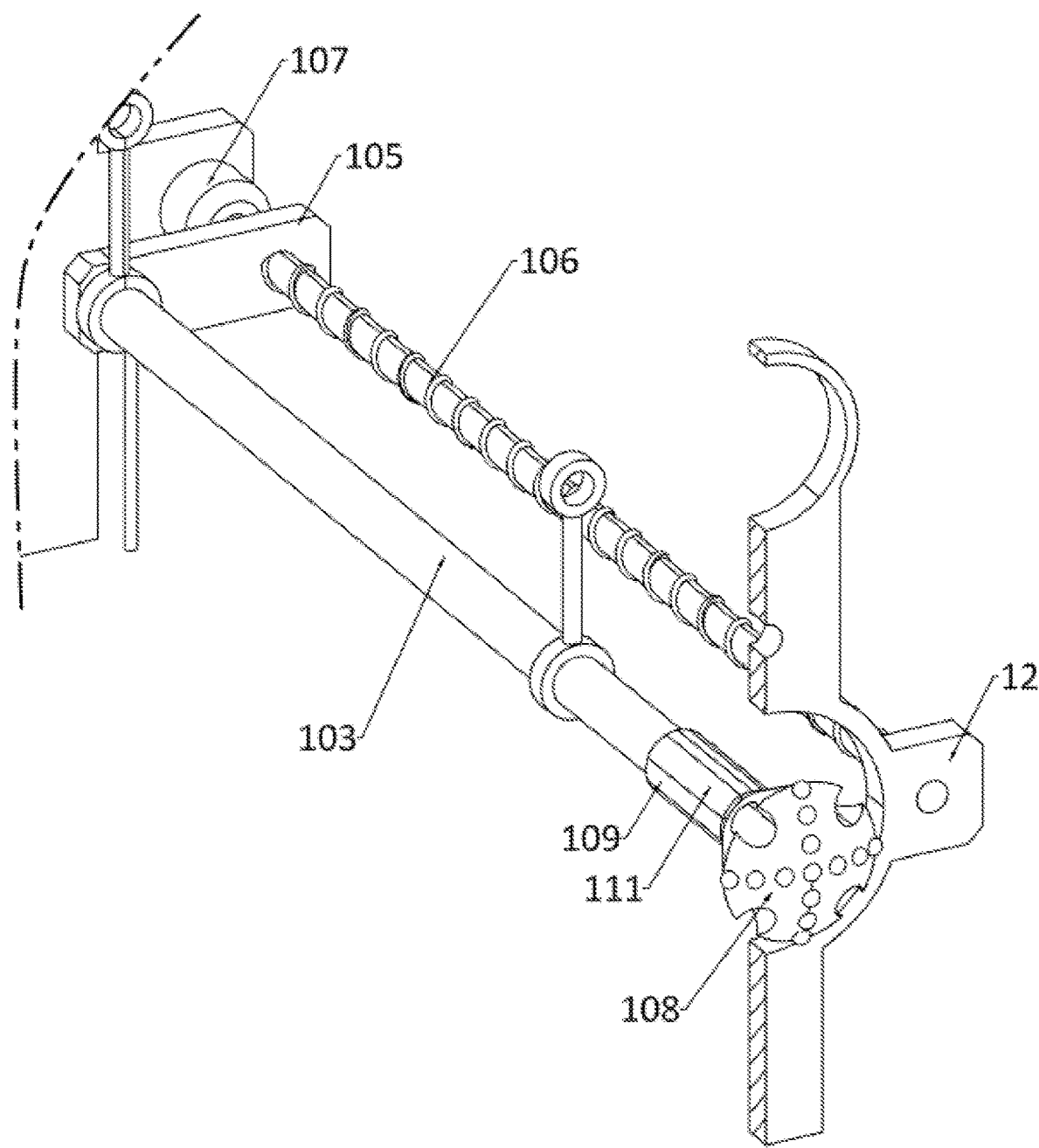
FIG. 3 is a schematic diagram of the three-dimensional structure of a rectangular connecting block, a drill rod, and a first motor, and other components of the present disclosure.
Figure 4:
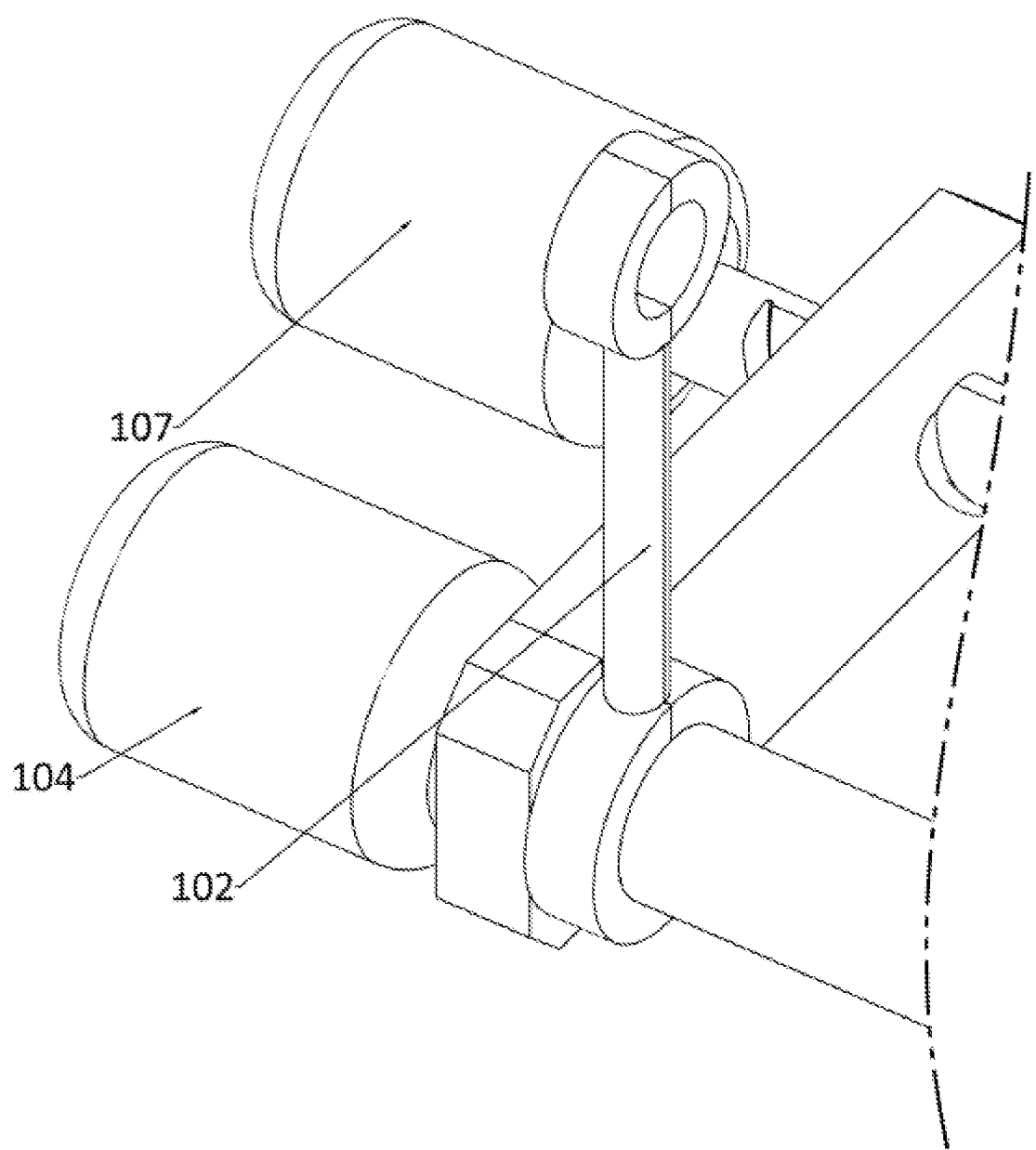
FIG. 4 is a schematic diagram of the three-dimensional structure of a first motor, a second motor, a support rod, and other components of the present disclosure.
Figure 5:
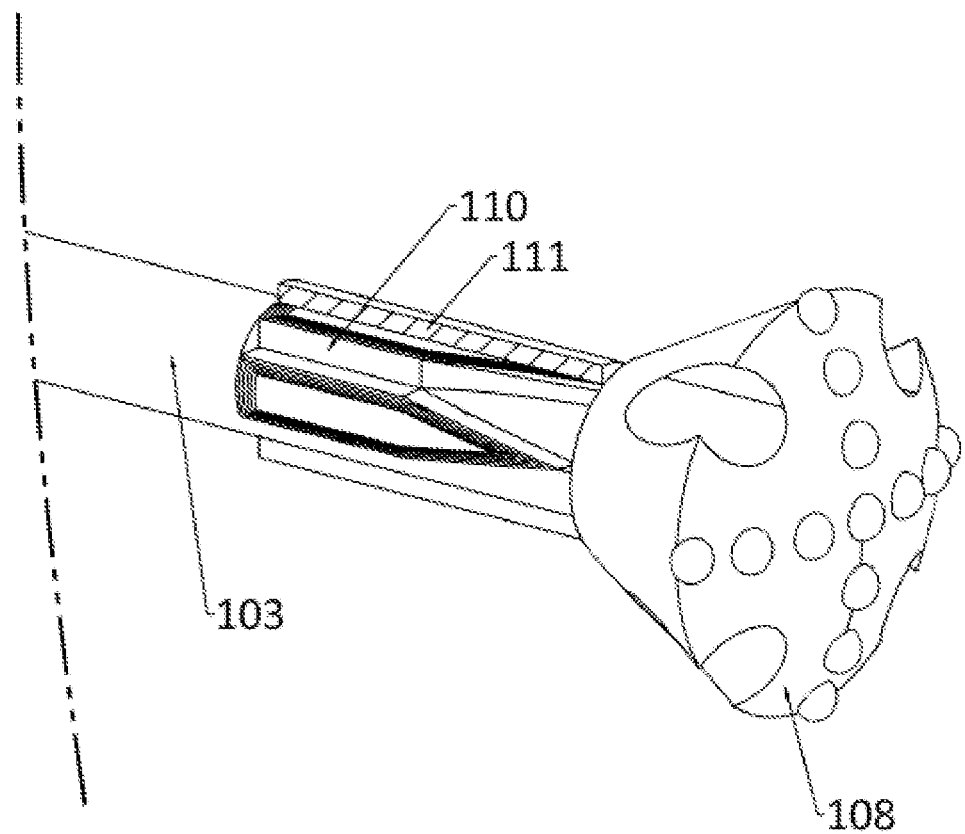
FIG. 5 is a schematic diagram of the three-dimensional structure of an arc-shaped plate, a pneumatic telescopic block, a drill bit, and other components of the present disclosure.
Figure 6:
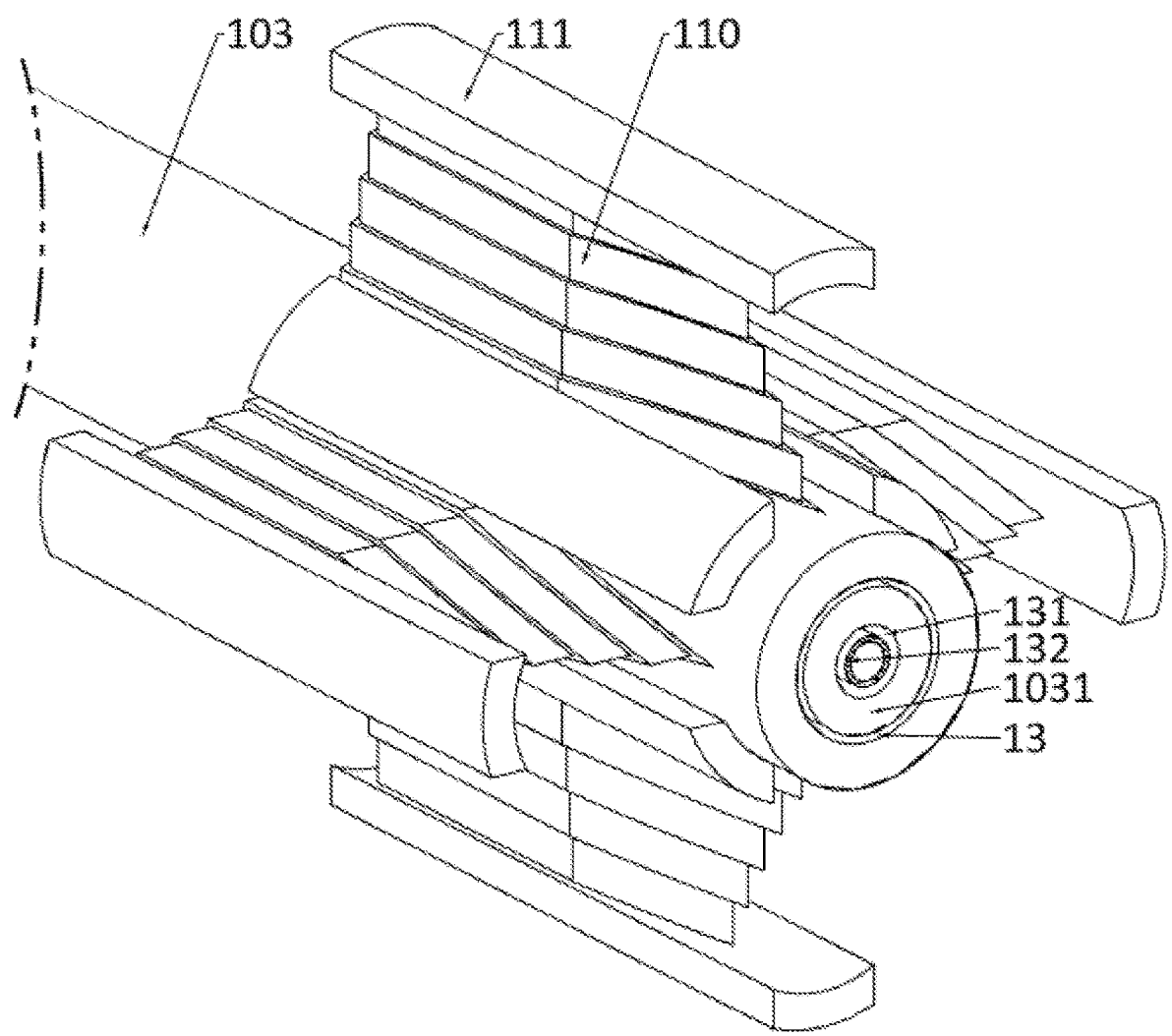
FIG. 6 is a schematic diagram of the three-dimensional structure of the arc-shaped plate of the present invention after opening.

Reference numbers in the drawings: 1. placement board, 11. first support pillar, 12. second support pillar, 101. transmission rod, 102. support rod, 103. connecting rod, 13. first cavity, 131. second cavity, 132. high-pressure gas pipe, 1031. drill rod, 1032. first gas pipe, 104. first motor, 105. rectangular connecting block, 106. first lead screw, 107. second motor, 108. drill bit, 109. arc-shaped block, 110. pneumatic telescopic block, 111. arc-shaped plate, 2. first seal housing, 21. second gas pipe, 22. sealing inner ring, 23. first gas bag, 24. dust filter screen, 202. gas pump, 201. second seal housing, 2011. linear actuator, 2012. second gas bag, 2013. third gas pipe, 2014. gas detector, 203. L-shaped dust removal pipe, 204. third motor, 205. conveyor belt, 301. connecting shaft, 302. transmission gear, 3021. rectangular groove, 3022. rectangular block, 303. L-shaped gear rack, 3031. tension spring, 304. limit block, 305. unlocking plate, 306. gas chamber, 402. first load-bearing plate, 4021. second load-bearing plate, 403. first L-shaped connecting plate, 404. self-locking motor, 5. connecting cylinder, 51. fixing ring, 501. moving ring, 502. second lead screw, 503. explosive filling cylinder, 5031. L-shaped connecting block, 5031. second L-shaped connecting plate, 504. first bevel gear, 505. rocker, 506. second bevel gear.

DETAILED DESCRIPTION OF THE EMBODIMENTS

In order to describe the purpose, technical scheme and beneficial effects of the present invention in more detail, the present invention will be further described with reference to the drawings and preferred embodiments. In fact, the following are only some embodiments of the present invention and not all of them.

In the present invention, the terms "first," "second," and "third" are merely for the purpose of description, but cannot be understood as indicating or implying relative importance. The term "multiple" means two or more unless otherwise explicitly defined. The terms "mount," "connect with," "connect," "fix," and the like shall be understood in a broad sense. For example, "connect" may mean being fixedly connected, detachably connected, or integrally connected; and "connect with" may mean being directly connected or indirectly connected through an intermediary. For those of ordinary skill in the art, specific meanings of the above terms in the present invention can be understood according to specific situations.

In the description of the present invention, it should be understood that if orientation or position relations indicated by the terms such as "upper," "lower," "left," "right," "front," "back," and the like are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention.

Embodiment 1

A drilling device for coal mining, as shown in FIG. 1-FIG. 6, including a placement board 1, the upper of the placement board 1 is fixedly connected to a first support pillar 11 and a second support pillar 12, and the first support pillar 11 and the second support pillar 12 are symmetrically distributed in a forward and backward manner. The first support pillar 11 and the second support pillar 12 are together fixedly connected to a transmission rod 101, the transmission rod 101 is connected to support rods 102 in a limited sliding manner, and the support rods 102 are symmetrically distributed in a forward and backward manner, such that the support rods 102 can only move forward and backward without any circumferential rotation. The lower end of the support rods 102 symmetrically distributed are together connected to a connecting rod 103 in a sliding manner, a first cavity 13 is set inside the connecting rod 103, and the lower side at the rear end of the connecting rod 103 is fixedly connected to a first gas pipe 1032 interconnected with the first cavity 13 of the connecting rod. A drill rod 1031 is rotationally connected in the interior of the connecting rod 103, and a second cavity 131 set inside of the drill rod 1031 is interconnected with a high-pressure gas pipe 132. The first support pillar 11 is fixedly connected to a second motor 107, and the output shaft of the second motor 107 is fixedly connected to a first lead screw 106 that is rotationally connected to the first support pillar 11 and the second support pillar 12. The first lead screw 106 is threadedly connected to a rectangular connecting block 105 fixedly connected to the rear end of the connecting rod 103, and the front side of the rectangular connecting block 105 is fixedly connected to the first motor 104. The output shaft of the first motor 104 is fixedly connected to the rear end of the drill rod 1031, and the rectangular connecting block 105 is connected to the drill rod 1031 in a limited rotating manner. The drill rod 1031 is fixedly connected and interconnected with a drill bit 108, and the front end of the connecting rod 103 is fixedly connected to four arc-shaped blocks 109 evenly distributed in a circumferential direction. The front end of the connecting rod 103 is provided with four grooves evenly distributed in a circumferential direction, and pneumatic telescopic blocks 110 are fixedly connected to the four grooves respectively. The end of each pneumatic telescopic block 110 close to the drill bit 108 is formed in a triangular shape to reduce the accumulation of dust during the drilling process. The pneumatic telescopic blocks 110 are interconnected with the first cavity 13, the telescopic ends of four pneumatic telescopic blocks 110 are fixedly connected to arc-shaped plates, respectively. The arc-shaped plate 111 slides between adjacent arc-shaped blocks 109, and the connecting rod 103 is provided with a blocking mechanism for drilling sealing.

Figure 7:
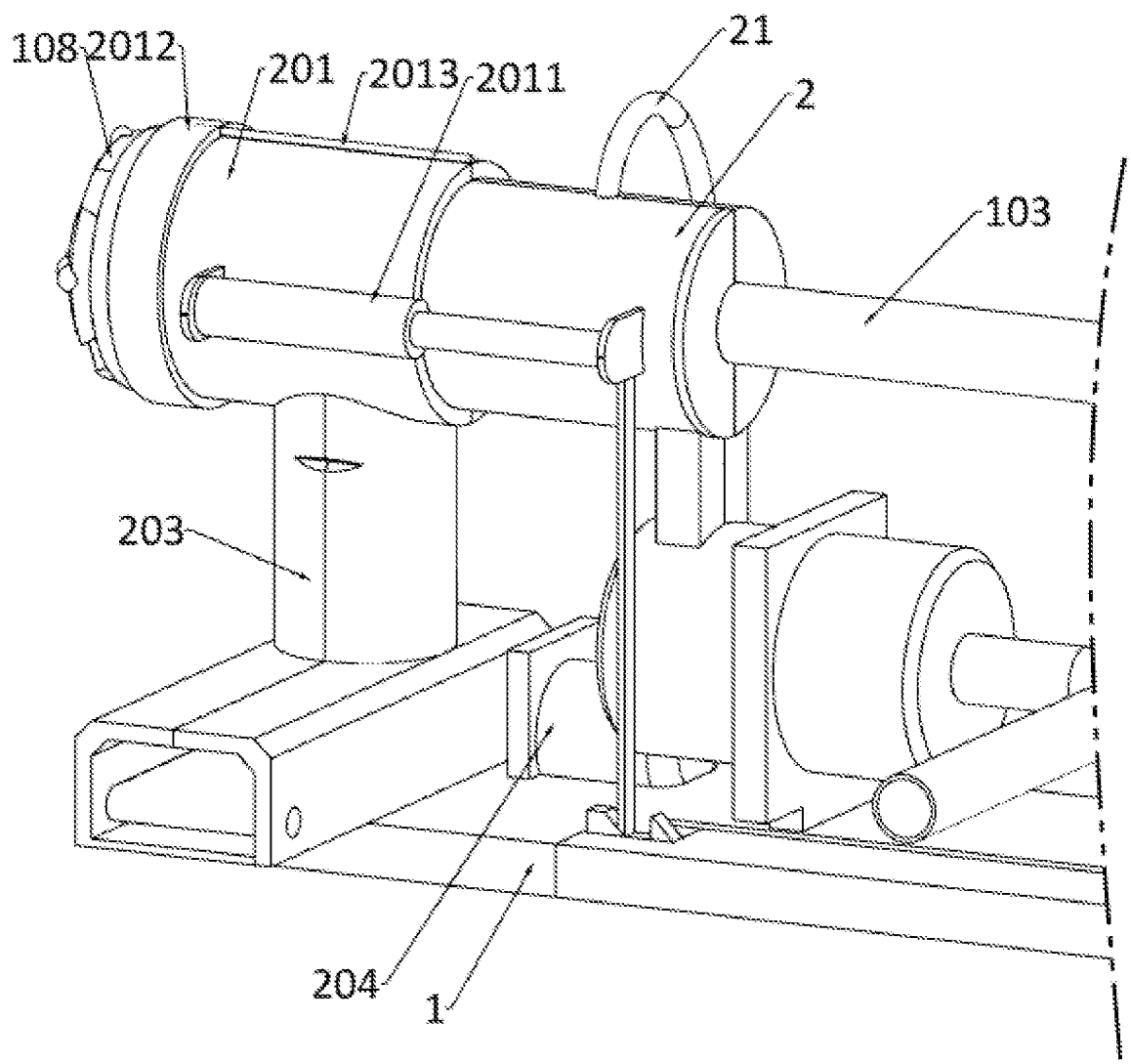
FIG. 7 is a schematic diagram of the three-dimensional structure of a blocking mechanism of the present disclosure.
Figure 8:
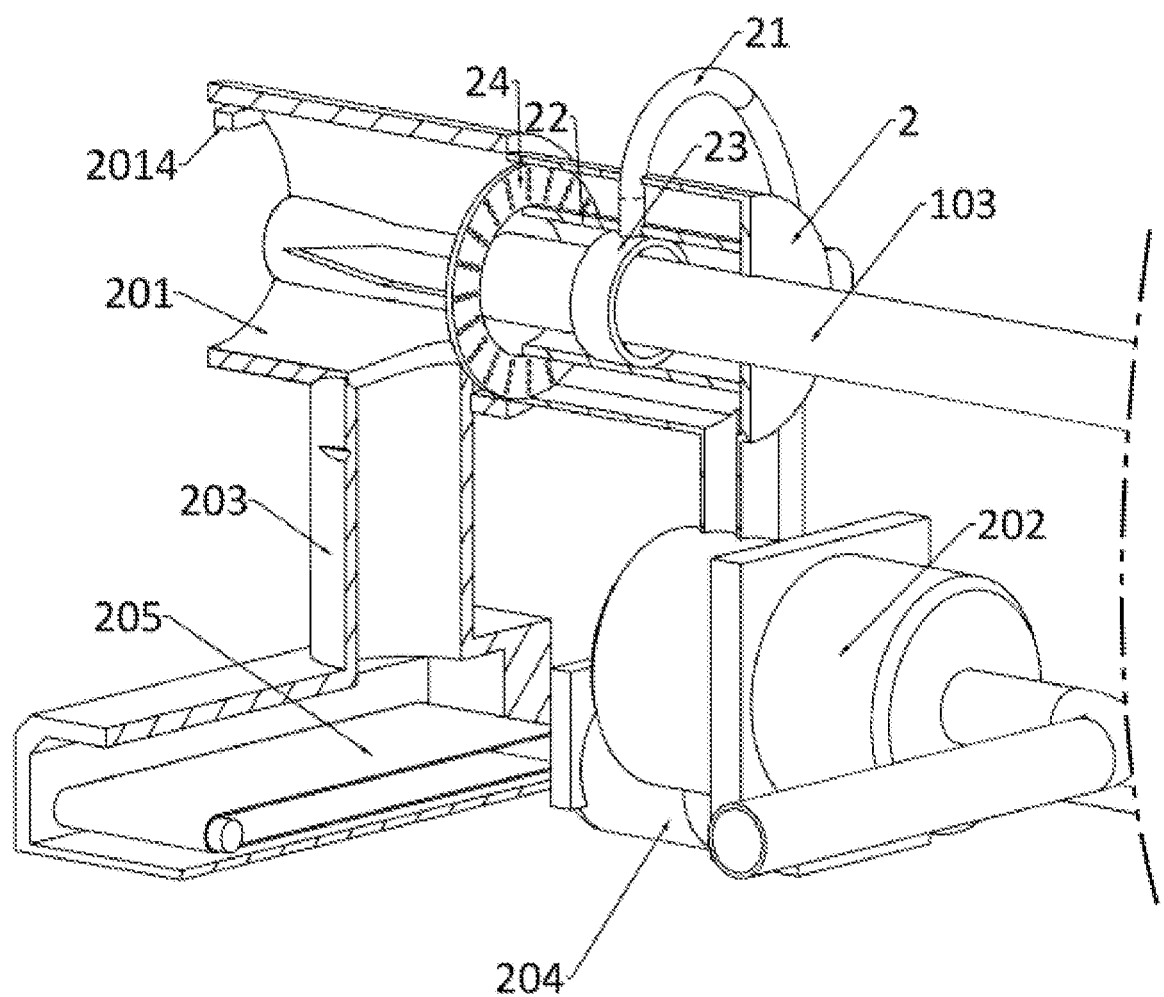
FIG. 8 is a schematic diagram of the three-dimensional structure of a first seal housing, a second gas pipe, a sealing inner ring, and other components of the present disclosure.

As shown in FIG. 7 and FIG. 8, the blocking mechanism includes a first seal housing 2, and the first seal housing 2 is slidably connected to the front part of the connecting rod 103. A sealing inner ring 22 is fixedly connected to the interior of the first seal housing 2, and a dust filter screen 24 is arranged between the front end of the sealing inner ring 22 and the front end of the first seal housing 2. The interior of the sealing inner ring 22 is fixedly connected with a first gas bag 23, a second gas pipe 21 extends through the first seal housing 2 and the sealing inner ring 22, and the first gas bag 23 is interconnected with the second gas pipe 23. The lower side at the rear end of the first seal housing 2 is connected to a gas pump 202, and the gas pump 202 is slidably connected to the upper side of the placement board 1 through a connecting block. The first seal housing 2 is slidably connected to the second seal housing 201, the frictional force between the first seal housing 2 and the second seal housing 201 is greater than the frictional force between the first seal housing 2 and the connecting rod 103. The diameter of the drilled hole 108 drilled by the drill bit is greater than the diameter of an outer ring of the second seal housing 201. The second seal housing 201 is fixedly connected to linear actuators 2011 symmetrically distributed along left and right sides, and telescopic ends of two linear actuator are fixedly connected to the first seal housing 2. The outer side of the second seal housing 201 is fixedly connected to a second gas bag 2012, the lower side of the second gas bag 2012 is connected to a third gas pipe 2013, and with a gas detector 2014 is fixedly provided inside the second seal housing 201. The lower side of the second seal housing 201 is interconnected with an L-shaped dust removal pipe 203, the horizontal portion of the L-shaped dust removal pipe 203 is fixedly connected to the placement board 1, the vertical portion of the L-shaped dust removal pipe 203 is provided with water spray ports distributed along circumferential direction, which is used to increase the weight of the discharged dust while adsorbing it onto water droplets, preventing dust from spreading during discharge. The front part at the upper side of the placement board 1 is fixedly connected to a third motor 204. A conveyor belt 205 is arranged inside the L-shaped dust removal pipe 203, the output shaft of the third motor 204 is fixedly connected to the drive shaft of the conveyor belt 205, and the placement board 1 is provided with a cutting mechanism.

Figure 9:
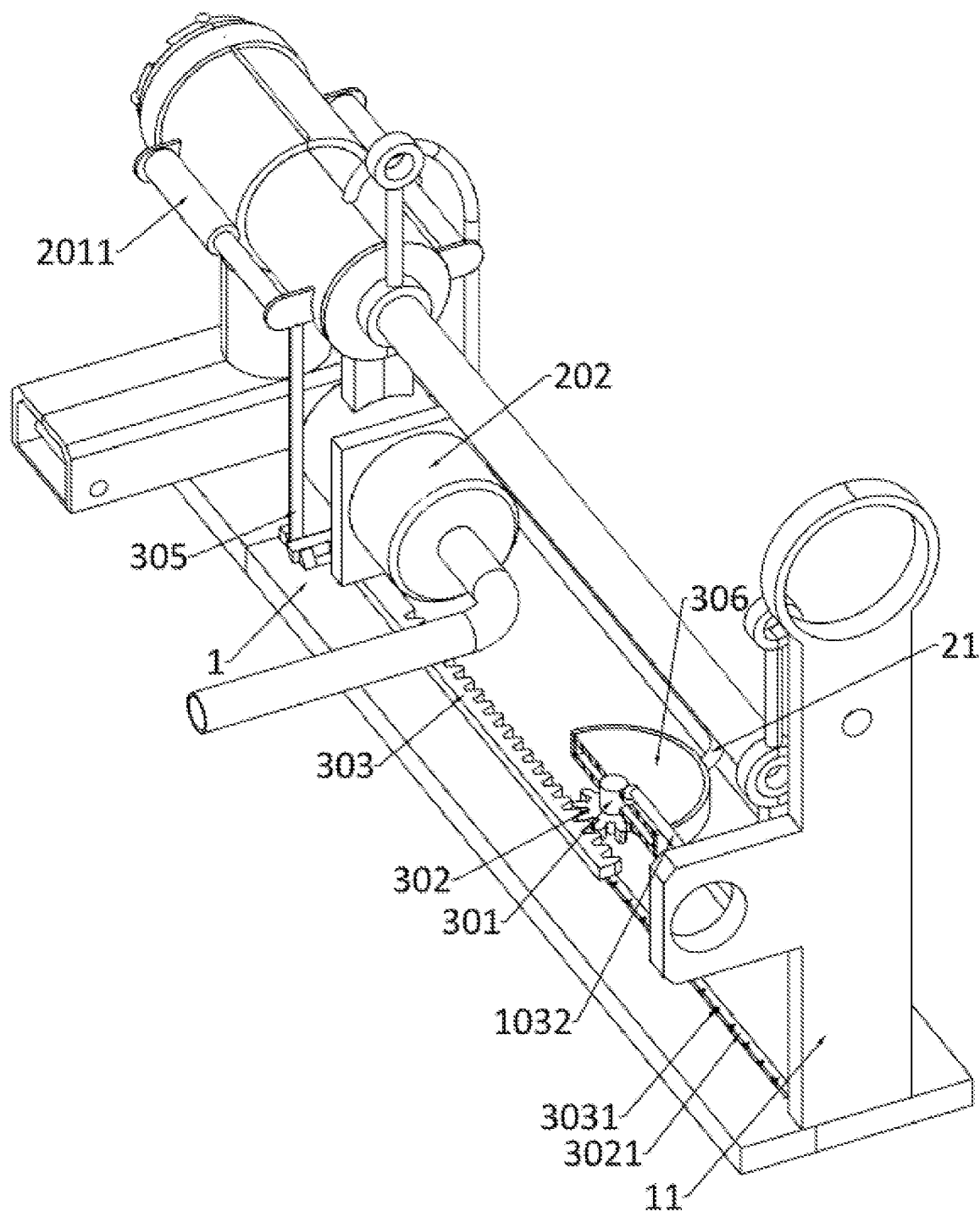
FIG. 9 is a schematic diagram of the three-dimensional structure of the cutting mechanism of the present disclosure.
Figure 10:
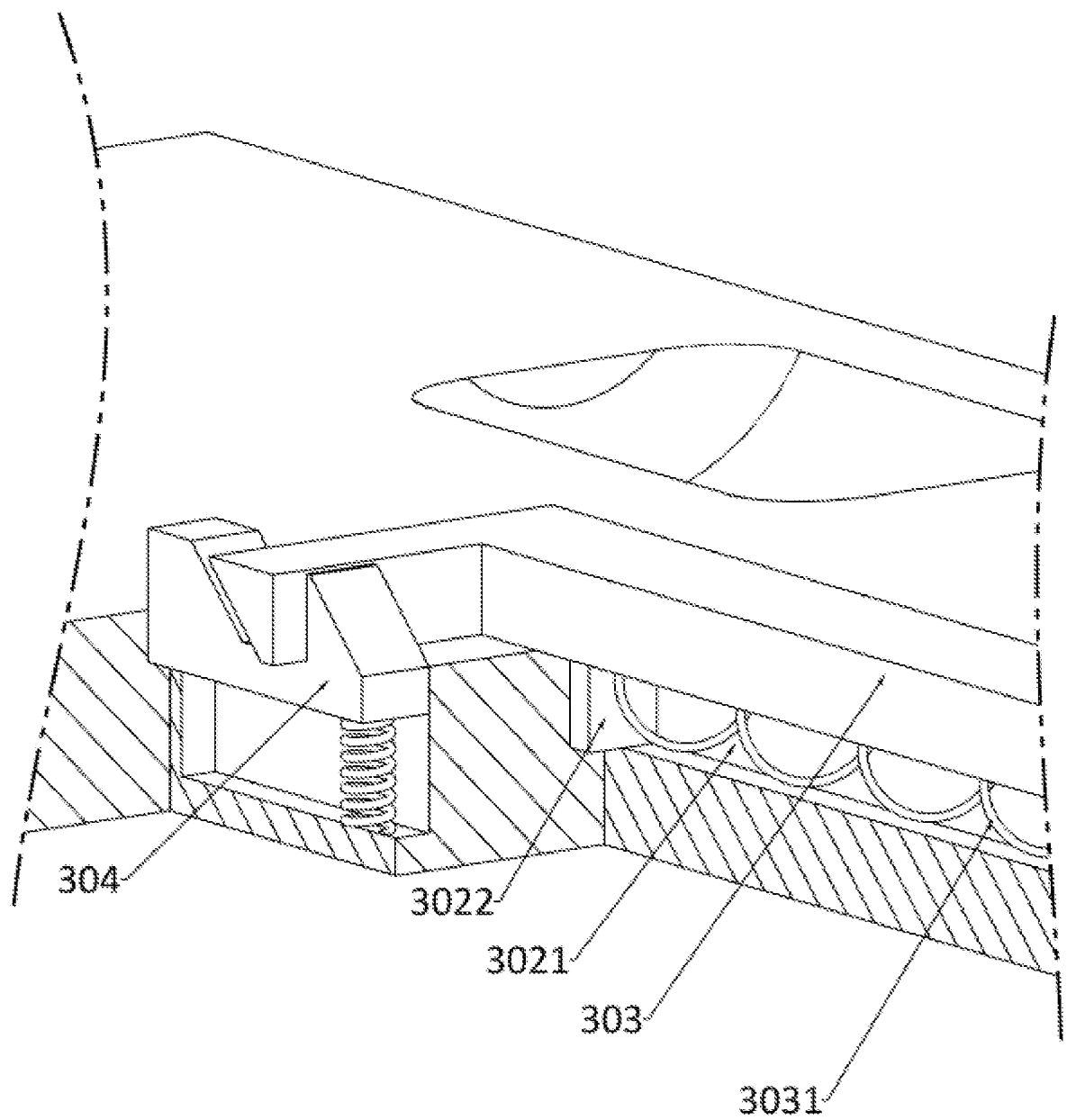
FIG. 10 is a schematic diagram of the three-dimensional structure of an L-shaped gear rack, a limit block, and a tension spring, and other components of the present disclosure.

As shown in FIG. 9-FIG. 10, the cutting mechanism includes a connecting shaft 301, the connecting shaft 301 is fixedly connected to the upper side of the placement board 1, and the middle portion of the connecting shaft 301 is rotatably connected to a transmission gear 302. The placement board 1 is provided with a rectangular groove 3021, the upper side of the placement board 1 is slidably connected to an L-shaped gear rack 303, and the lower side at one end of the L-shaped gear rack 303 close to the first support pillar 11 is provided with a rectangular block 3022 sliding inside the rectangular groove 3021 of the placement board 1. A transverse part of the L-shaped gear rack 303 is formed in a wedge shape, the position of the placement board 1 close to the gas pump 202 is provided with a limit sliding groove, and a limit block 304 is slidably connected inside the limit sliding groove of the placement board 1. The limit block 304 matches with the transverse part of the L-shaped gear rack 303 to limit the position of the L-shaped gear rack 303. There is an elastic component fixedly connected between the placement board 1 and the limit block 304, which is used to maintain the initial position of the limit block 304 and drive the moved limit block 304 to reset to the initial position. A tension spring 3031 is arranged between the rectangular block 3022 and the placement board 1. The telescopic end of each linear actuator 2011 is fixedly connected to an unlocking plate 305, the unlocking plate 305 matches with the limit block 304, the limit block 304 is formed as a double wedge-shaped surface shape, and the two wedge-shaped surfaces are matched with the unlocking plate 305 and the L-shaped gear rack 303, respectively. The connecting shaft 301 is rotatably connected to a gas chamber 306, the gas chamber 306 is provided with an outer ring and an inner ring, the inner ring of the gas chamber 306 rotates inside the outer ring, and the inner ring is equipped with holes that match the outer ring. The lower side of the inner ring of the gas chamber 306 is fixedly connected to the upper side of the transmission gear 302, and the input ends of the first gas pipe 1032 and the second gas pipe 21 are interconnected to the outer ring of the gas chamber 306. The part of the inner ring of the gas chamber 306 that matches the second gas pipe 21 is set in an arc shape.

In the process of coal mining, when encountering thick coal seams that require blasting, the staff first moves the device to a designated position and fixes it. Then, the staff connects the delivery port of the gas pump with the gas chamber 306. Then, the staff starts the gas pump to fill the gas chamber 306 with high-pressure gas, and the high-pressure gas is transmitted from the gas chamber 306 to the first gas pipe 1032 and the second gas pipe 21.

After fixing the device and connecting the air pump, the staff starts the first motor 104. The output shaft of the first motor 104 drives the drill rod 1031 to rotate, and the drill rod 1031 drives the drill bit 108 set at the front end to rotate. Then, the staff starts the second motor 107. The output shaft of the second motor 107 drives the first lead screw 106 to rotate. The first lead screw 106 drives the rectangular connecting block 105 to move through the transmission of the thread, then the rectangular connecting block 105 drives the drill rod 1031 to move, and then the drill rod 1031 moves through the connecting rod 103. The drill rod 1031 drives the drill bit 108 to move forward while rotating, so as to drill coal seams. During this process, the staff activates the high-pressure gas pipe 132 connected to the rear end of drill rod 1031, conveying high-pressure gas forward along the drill rod 1031 until the high-pressure gas is discharged from the hole of drill bit 108, blowing out the dust generated during the drilling process of drill bit 108.

During the drilling process of the drill bit 108 mentioned above, the drill rod 1031 drives the connecting rod 103 to move forward synchronously. The connecting rod 103 drives the arc-shaped blocks 109, the arc-shaped plates 111, the pneumatic telescopic blocks 110, the connecting rod 103, and the first seal housing 2 to move forward synchronously. The first seal housing 2 drives the second seal housing 201 and other parts to move forward synchronously. During this process, the second seal housing 201 will first enter the drilled hole drilled by the drill bit 108, providing preliminary support to the drilling wall until the fixed end of the linear actuator 2011 comes into contact with the wall surface of the coal seam, and the first seal housing 2 and other parts stop moving forward.

When the first seal housing 2 and other parts stop moving forward, the drill bit 108 continues to drill forward until the vertical positions of the arc-shaped blocks 109, the arc-shaped plates 111, and the pneumatic telescopic blocks 110 away from one end of the drill bit 108 are all at the front end of the second seal housing 201, the staff opens the valve on the first gas pipe 1032. At this moment, the gas in the gas chamber 306 enters into the first cavity 13 through the first gas pipe 1032, and the four pneumatic telescopic blocks 110 arranged at the front end of the connecting rod 103 are extended in a circumferential direction. The telescopic ends of the four pneumatic telescopic blocks 110 respectively drive adjacent arc-shaped plates 111 to move synchronously and open in a circumferential direction until all four arc-shaped plates 111 come into contact with the drilling wall, so as to support the drilling near the drill bit 108, preventing the prolonged working time and delayed production progress caused by the collapse of the drilling wall close to the drill bit due to excessive vibration amplitude of the drill bit, while also preventing damage to the drilling device due to hole wall collapse. The front end of each of the four pneumatic telescopic blocks 110 is set in a triangular shape, which can effectively prevent dust accumulation during the drilling process at the connection between the four pneumatic telescopic blocks 110, the arc-shaped plates 111, and the connecting rod 103.

When the first seal housing 2 drives other parts moving forward, the second gas bag 2012 is also synchronously driven into the drilled hole until the first seal housing 2 stops moving forward. The staff opens the valve of the third gas pipe 2013, and the gas is transmitted to the second gas bag 2012 through the third gas pipe 2013, causing the second gas bag 2012 to expand circumferentially until the outer wall of the second gas bag 2012 contacts the inner wall of the drilled hole, so as to seal the drilled hole, preventing the dust generated during the drilling process from leaking and affecting the respiratory system of the staff. Further, the front end of the second seal housing 201 is set as an inclined surface, which can effectively prevent dust from accumulating at the front end of the second seal housing 201. At this time, the dust generated during the drilling process will be blown into the second seal housing 201 by high-pressure gas flowing out of the drill pipe 1031. Then, the dust falls along the vertical pipeline of the L-shaped dust removal pipe 203 onto the conveyor belt 205 inside the horizontal pipeline of the L-shaped dust removal pipe 203. The staff then starts the third motor 204, and the output shaft of the third motor 204 drives the drive shaft of the conveyor belt 205 to rotate, thereby driving the conveyor belt 205 to move and sending the accumulated dust on the conveyor belt 205 to the next processing device, preventing the dust generated during the drilling process from accumulating in the blasting hole to affect the drilling process. During this process, when dust moves along the vertical pipeline of the L-shaped dust removal pipe 203, water mist will be sprayed out from the vertical pipeline of the L-shaped dust removal pipe 203 in a circumferential direction, make dust heavier when exposed to water mist and adsorbing dust onto water droplets to prevent dust from spreading during discharge which will cause a threat to the physical safety of workers and even dust explosions.

During the drilling process, when the drill bit 108 reaches the gas layer, it first breaks through the layer wall of the gas layer, and then the gas will spread out. When the gas detector 2014 detects gas leakage, an alarm will sound, at this time, the linear actuator 2011 will start synchronously. The telescopic end of the linear actuator 2011 will pull the first seal housing 2 towards the direction close to the second seal housing 201, until the linear actuator 2011 starts to contract to the limit position, at this point, the first seal housing 2 just covers the connection between the second seal housing 201 and the L-shaped dust removal pipe 203, preventing gas leakage along the L-shaped dust removal pipe 203 and posing a threat to the safety of workers.

During the contraction process of the linear actuator 2011 mentioned above, the first seal housing 2 drives the second gas pipe 21, the sealing inner ring 22, the first gas bag 23, and the gas pump 202 to slide forward on the placement board 1. During this process, the telescopic end of the linear actuator 2011 drives the unlocking plate 305 to move forward. The wedge-shaped surface of the unlocking plate 305 is matched with the wedge-shaped surface near the second support pillar 12 on the limit block 304, so as to press the limit block 304 down, until the upper end face of the limit block 304 contacts the bottom end of the unlocking plate 305, the limit block 304 releases the limitation on the L-shaped gear rack 303. The L-shaped gear rack 303 moves towards the direction close to the first support pillar 11 under the action of the tension spring 3031. At this time, the movement of the L-shaped gear rack 303 will drive the transmission gear 302 to rotate circumferentially around the connecting shaft 301, thereby driving the inner ring of the gas chamber 306 to rotate, so that the position of the air outlet on the inner ring of the gas chamber 306 and the air outlet on the outer ring of the gas chamber 306 is changed, and gas is no longer supplied to the first gas pipe 1032. The arc-shaped plate 111 gradually resets to its initial position. At the same time as the linear actuator 2011 is started, the staff stops the first motor 104 and the second motor 107, and the drill rod 1031 stops moving forward and also stops rotating.

When the gas chamber 306 no longer supplies gas to the first gas pipe 1032, the arc-shaped groove on the inner ring of the gas chamber 306 cooperates with the second gas pipe 21 connected to the outer ring of the gas chamber 306, the gas chamber 306 begins to deliver gas to the second gas pipe 21, and there is no valve installed on the second gas pipe 21, so the gas inside the second gas pipe will be directly delivered to the first gas bag 23. The first gas bag 23 is expanded to filling the gap between the sealing inner ring 22 and the connecting rod 103, to prevent gas leakage from the gap between the first seal housing 2 and the connecting rod 103, the staff then starts the gas pump 202 to extract and discharge the gas into the gas treatment device until all the gas is discharged.

After all the gas is discharged, the gas detector 2014 no longer sounds an alarm. The staff stops the air pump and then pulls out the second gas pipe 21 from the outer ring of the gas chamber 306 to discharge the gas inside the first gas bag 23, resetting the first gas bag 23. Then, the staff pulls the L-shaped gear rack 303 towards the end close to the second support pillar 12 until the lower side of the L-shaped gear rack 303 contacts the upper end of the wedge-shaped surface of the limit block 304 near the first support pillar 11. At this moment, the limit block 304 is completely located in the groove of the placement board 1, and then the staff restarts the linear actuator 2011, causing its telescopic end to connect the first seal housing 2 and the first seal housing 2, so that all other parts begin to reset towards the initial position until the telescopic end of the linear actuator 2011 drives the unlocking plate 305 to reset to the initial position. At this time, the first seal housing 2 and other parts connected to the first seal housing 2 are synchronously reset to the initial position. Then, the staff continues to pull the L-shaped gear rack 303 towards the end close to the second support pillar 12 until the L-shaped gear rack 303 loses contact with the wedge-shaped surface of the limit block 304, at this point, the limit block 304 moves upwards to its initial position under the action of the spring set between the limit block 304 and the placement board 1, and then matches with the L-shaped gear rack 303 again to limit it.

During the movement of the L-shaped gear rack 303 mentioned above, the L-shaped gear rack 303 drives the transmission gear 302 to rotate in the reverse direction, thereby driving the inner ring of the gas chamber 306 to rotate in the reverse direction. When the L-shaped gear rack 303 is reset to its initial position, the air supply port on the inner ring of the gas chamber 306 and the air supply port on the outer ring of the gas chamber 306 are re-matched, and at this time, the arc-shaped groove on the inner ring of the gas chamber 306 is not in contact with the second gas pipe 21 interconnected to the outer ring of the gas chamber 306.

Subsequently, the staff reconnects the second gas pipe 21 to the designated position on the outer ring of the gas chamber 306.

After the above workflow is completed, the staff restarts the air pump, the first motor 104, and the second motor 107. At this time, the valve set on the first gas pipe 1032 has not been closed, so there is no need for the staff to restart the valve. This allows the drill rod 1031 and other parts connected to the connecting rod 103 to resume work and continue drilling forward.

When the drilled hole has reached the required blasting position, the staff stopped the air pump and the second motor 107 again, and disconnected the third gas pipe 2013 to allow the gas inside the second gas bag 2012 to be discharged outward until the second gas bag 2012 is reset to its initial position. During this process, the staff simultaneously pulled out the first gas pipe 1032 from the outer ring of the gas chamber 306, resetting the pneumatic telescopic blocks 110 set on the connecting rod 103, thereby driving the arc-shaped plates 111 to reset to their initial position, and then the staff restarts the second motor 107. At this time, the output shaft of the second motor 107 rotates in the reverse direction, driving the first lead screw 106 to reverse, and then driving the rectangular connecting block 105 and other connected parts to reset to their initial state.

Embodiment 2

Figure 11:
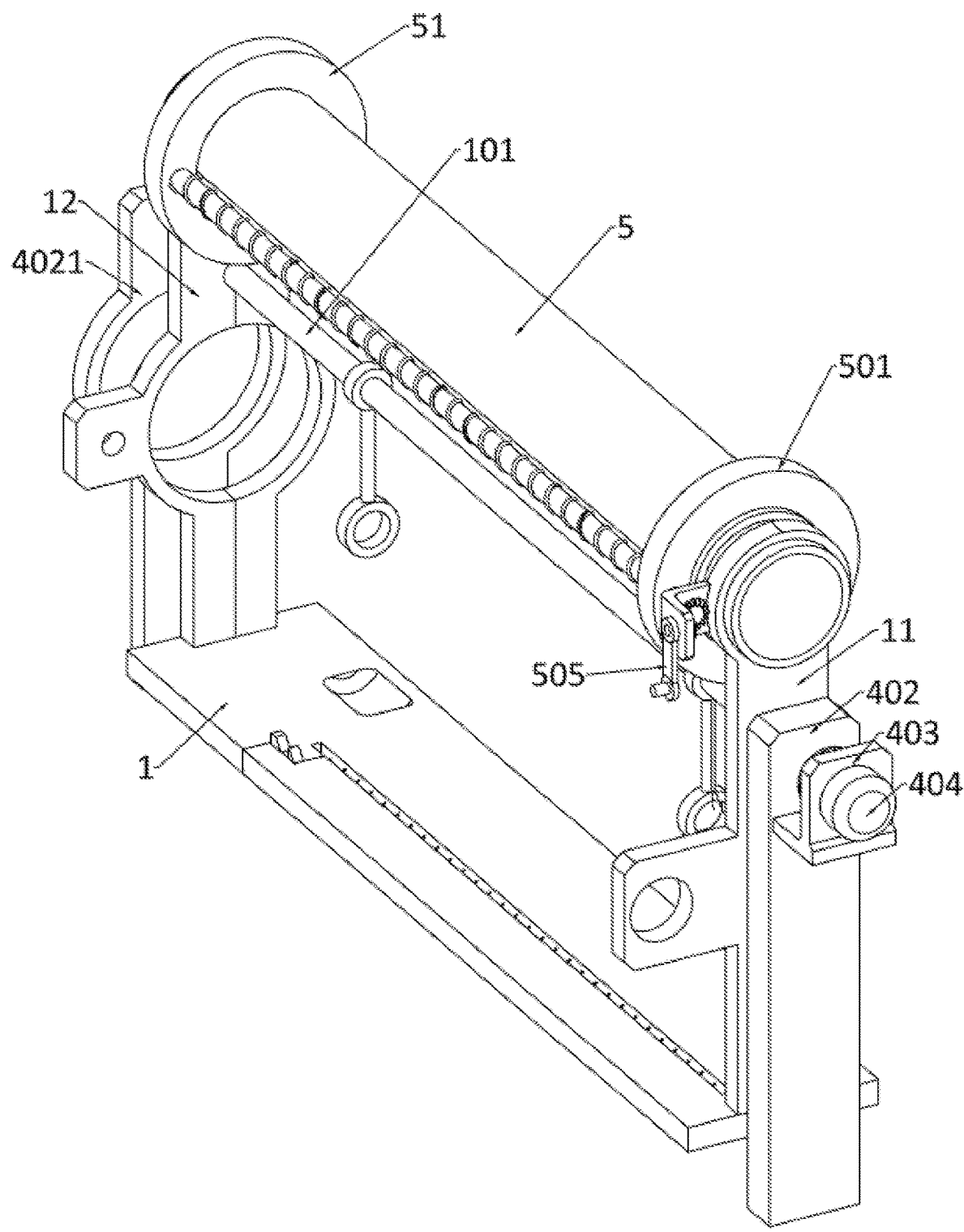
FIG. 11 is a schematic diagram of the three-dimensional structure of a replacement mechanism and an explosive filling assembly of the present disclosure.

On the basis of Embodiment 1, as shown in FIG. 11, the drilling device further includes a replacement mechanism configured for switching the drill bit, wherein the replacement mechanism is arranged on the rear side of the first support pillar 11 and the front side of the second support pillar 12. The replacement mechanism includes a first load-bearing plate 402, the first load-bearing plate 402 is rotatably connected to the rear end of the transmission rod 101, the front end of the transmission rod 101 is rotatably connected to a second load-bearing plate 4021, and the first load-bearing plate 402 and the second load-bearing plate 4021 are symmetrically distributed. The upper part of the rear side of the first load-bearing plate 402 is fixedly connected to a first L-shaped connecting plate 403, the vertical part of the first L-shaped connecting plate 403 is fixedly connected to a self-locking motor 404, and the output shaft of the self-locking motor 404 is fixedly connected to the rear end of the transmission rod 101, which is configured to drive the transmission rod 101 to move and to lock the transmission rod 101.

Figure 12:
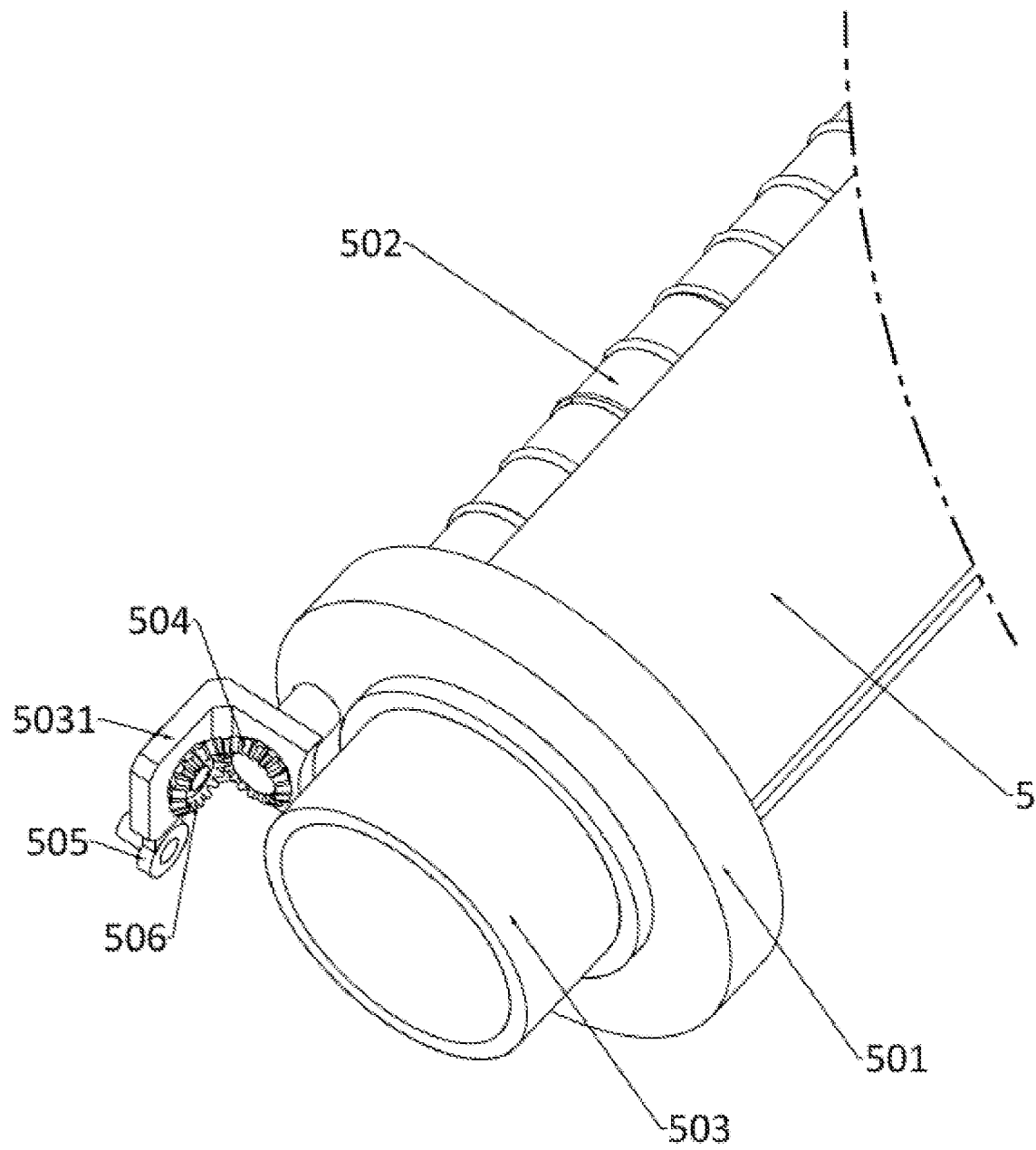
FIG. 12 is a schematic diagram of the three-dimensional structure of a connecting cylinder, the fixing ring, and the second lead screw, and other components of the present disclosure.
Figure 13:
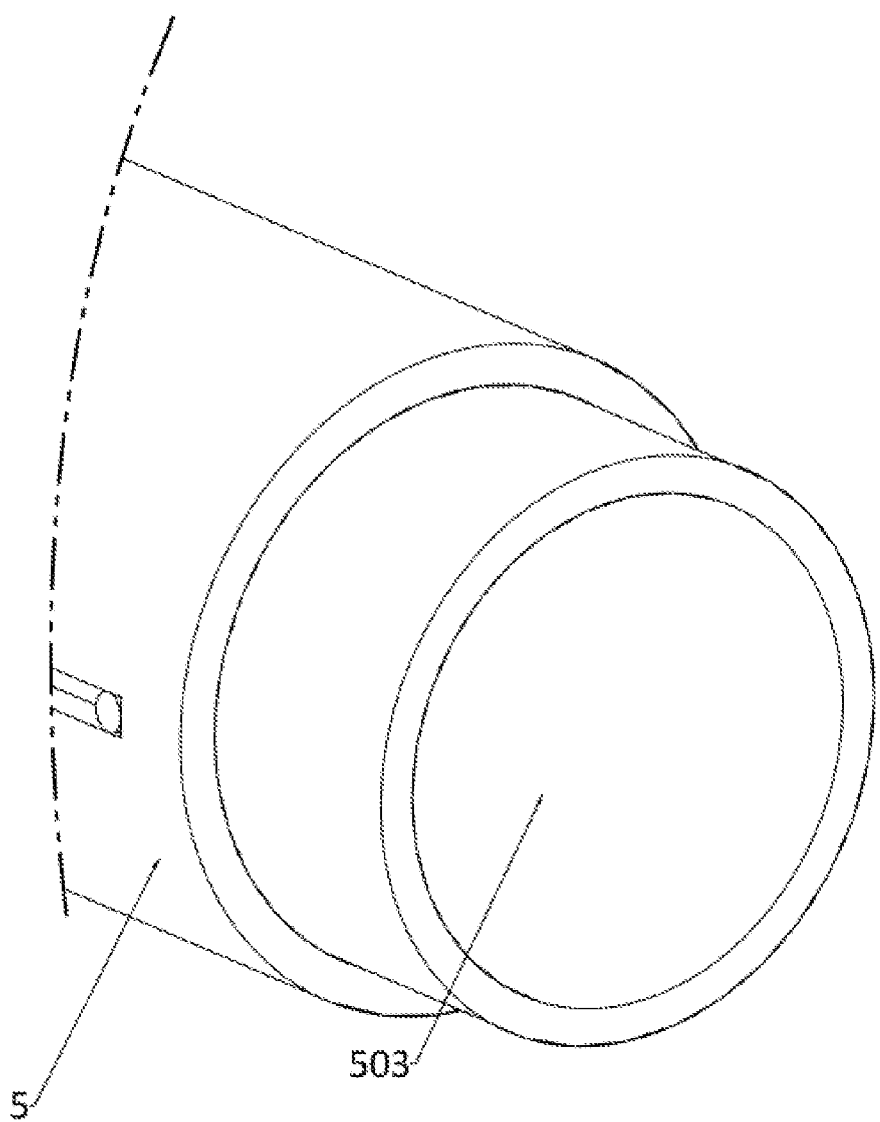
FIG. 13 is a schematic diagram of the three-dimensional structure of the connecting cylinder and an explosive filling cylinder of the present disclosure.

As shown in FIG. 11-FIG. 13, the drilling device further includes the explosive filling assembly, wherein the explosive filling assembly is configured to fill the hole with explosives, and the explosive filling assembly is arranged between the first support pillar 11 and the second support pillar 12. The explosive filling assembly includes a connecting cylinder 5, the connecting cylinder 5 is provided with sliding grooves symmetrically distributed along the right and left sides, the front end of the connecting cylinder 5 are fixedly connected to the second support pillar 12, and the rear end of the connecting cylinder 5 are fixedly connected to the first support pillar 11. The front end of the connecting cylinder 5 is fixedly connected to a fixing ring 51, and the rear end of the connecting cylinder 5 is slidably connected to a moving ring 501. The moving ring 501 and the fixing ring 51 are symmetrically distributed on the connecting cylinder 5 in a forward and backward manner. The fixing ring 51 is rotatably connected to a second lead screw 502, and the moving ring 501 and the second lead screw 502 are in threaded fit. The connecting cylinder 5 is slidably connected to an explosive filling cylinder 503, the length of the explosive filling cylinder 503 is greater than the length of the connecting cylinder 5, and the right and left sides of the explosive filling cylinder 503 are respectively provided with a sliding post that matches the sliding groove on the connecting cylinder 5. The other ends of both sliding post are fixedly connected to the moving ring 501 at the rear end, which is used to drive the explosive filling cylinder 503, moving forward. The right side of the upper end of the first support pillar 11 is fixedly connected to a second L-shaped connecting plate 5031, and the second lead screw 502 is rotatably connected to the second L-shaped connecting plate 5031. A first bevel gear 504 is fixedly connected to the second lead screw 502, the right side of the second L-shaped connecting plate 5031 is rotatably connected to a rocker 505, the rocker 505 is fixedly connected to a second bevel gear 506, and the second bevel gear 506 meshes with the first bevel gear 504, which is used to rotate the second lead screw 502, thereby causing the moving ring 501 to move forward.

Before using this device, the staff first fix the first load-bearing plate 402 and the second load-bearing plate 4021 in the required drilling positions. The first load-bearing plate 402 and the second load-bearing plate 4021 provide additional support to the device through the transmission rod 101, increasing the stability of the device during use. Then, the staff can drill the blasting hole according to the above drilling operation process.

When the drilled hole has reached the required blasting position, the staff will reset all the parts used to their initial positions. The staff will start the self-locking motor 404, and the output shaft of the self-locking motor 404 will drive the first support pillar 11 and the second support pillar 12 to rotate circumferentially around the center of the transmission rod 101 through the transmission of the transmission rod 101. During this process, the first support pillar 11 and the second support pillar 12 together drive the placement board 1 and other parts connected to the placement board 1 to rotate synchronously. During this process, the first support pillar 11 and the second support pillar 12 also jointly drive the connecting cylinder 5 and other parts connected to the connecting cylinder 5 to rotate synchronously until the first support pillar 11 and the second support pillar 12 rotate 180 degrees, at this moment, the height of the connecting cylinder 5 is equal to the height of the blasting hole. Then, the staff stopped the self-locking motor 404 to lock the transmission rod 101.

After the adjustment of the device is completed, the staff shakes the rocker 505, and the rocker 505 drives the second bevel gear 506 to rotate. The second bevel gear 506 meshes with the first bevel gear 504, which in turn drives the second lead screw 502 to rotate, causing the moving ring 501 to move forward. The moving ring 501 drives the explosive filling cylinder 503 to move forward synchronously along the sliding groove set on the connecting cylinder 5 until the front end of the explosive filling cylinder 503 reaches the bottom of the blasting hole. Then, the staff stops shaking the rocker 505, and use other tools to fill the explosive filling cylinder 503 with explosives to separate the explosives from the wall of the blasting hole, preventing uneven filling of explosives due to the explosives come into contact with the wall of the blasting hole during the filling process, resulting in the blasting effect not meeting the planned requirements.

Subsequently, the staff can use other devices to seal the explosives in the explosive filling cylinder 503, preventing from affecting the explosives when the explosive filling cylinder 503 is withdrawn. After sealing the explosives, the staff can rotate the rocker 505 in reverse to drive the above parts to reset to the initial position until the explosive filling cylinder 503 is completely withdrawn from the blasting hole. After that, the staff can restart the self-locking motor 404, and the output shaft of the self-locking motor 404 is reversed to drive the first support pillar 11 and the second support pillar 12 to reset to the initial position, thereby resetting all other parts connected to the first support pillar 11 and the second support pillar 12 to the initial position. After all the parts on this device are reset to their initial positions, the staff will remove the first load-bearing plate 402 and the second load-bearing plate 4021, and move the device to a safe position until all the staff have evacuated to the safe position before blasting can be proceed.

The present embodiments have been further described with reference to the drawings. According to the above description, all person skilled in the art should have a clear understanding of the drilling device for coal mining of the present invention. In the embodiments described above, the purpose, technical scheme and beneficial effects of the invention have been described in further detail. Certainly, the above descriptions are merely preferred embodiments of the present disclosure. The present disclosure is not limited to the above embodiments listed. It should be noted that, all equivalent replacements and obvious variations made by any person skilled in the art under the teaching of the specification fall within the essential scope of the specification and shall be protected by the present disclosure.

What is claimed is:

1. A drilling device for coal mining, comprising a placement board, wherein the placement board is fixedly connected to a first support pillar and a second support pillar, the first support pillar and the second support pillar are together fixedly connected to a transmission rod, the transmission rod is connected to support rods symmetrically distributed in a limited sliding manner, the support rods symmetrically distributed are connected to a connecting rod in a sliding manner, a first cavity is set inside the connecting rod, the connecting rod is fixedly connected to a first gas pipe interconnected with the first cavity of the connecting rod, the connecting rod is rotationally connected to a drill rod, a second cavity set inside of the drill rod is interconnected with a high-pressure gas pipe, the first support pillar is fixedly connected to a second motor, an output shaft of the second motor is fixedly connected to a first lead screw that is rotationally connected to the first support pillar and the second support pillar, the first lead screw is threadedly connected to a rectangular connecting block fixedly connected to the connecting rod, the rectangular connecting block is fixedly connected to the first motor, an output shaft of the first motor is fixedly connected to the drill rod, the rectangular connecting block is connected to the drill rod in a limited rotating manner, the drill rod is fixedly connected and interconnected with a drill bit, the connecting rod is fixedly connected to arc-shaped blocks evenly distributed in a circumferential direction, the connecting rod is provided with grooves evenly distributed in a circumferential direction, pneumatic telescopic blocks are fixedly connected to the grooves, the pneumatic telescopic blocks are interconnected with the first cavity of the connecting rod, a telescopic end of each pneumatic telescopic block is fixedly connected to an arc-shaped plate, the arc-shaped plate slides between adjacent arc-shaped blocks, and the connecting rod is provided with a blocking mechanism for drilling sealing;

the blocking mechanism comprises a first seal housing, the first seal housing is slidably connected to the support rods, the first seal housing is fixedly connected to a sealing inner ring, a dust filter screen is arranged between the sealing inner ring and the first seal housing, the sealing inner ring is fixedly connected to a first gas bag, the first gas bag is interconnected with a second gas pipe, the second gas pipe extends through the first seal housing and the sealing inner ring, the first seal housing is connected to a gas pump, the gas pump is slidably connected to the placement board through a connecting block; the first seal housing is slidably connected to the second seal housing, the second seal housing is fixedly connected to linear actuators symmetrically distributed, a telescopic end of each linear actuator is fixedly connected to the first seal housing, the second seal housing is fixedly connected to a second gas bag, the second gas bag is connected to a third gas pipe, the second seal housing is provided with a gas detector, the second seal housing is interconnected with an L-shaped dust removal pipe, the L-shaped dust removal pipe is fixedly connected to the placement board, a vertical part of the L-shaped dust removal pipe is provided with spray nozzles distributed in a circumferential direction, the L-shaped dust removal pipe is fixedly connected to a third motor that is fixedly connected to the placement board, a conveyor belt is arranged in the L-shaped dust removal pipe, an output shaft of the third motor is fixedly connected to a drive shaft of the conveyor belt, and the placement board is provided with a cutting mechanism;

the cutting mechanism comprises a connecting shaft, the connecting shaft is fixedly connected to the placement board, the connecting shaft is rotatably connected to a transmission gear, the placement board is provided with a rectangular groove, the placement board is slidably connected to an L-shaped gear rack, one end of the L-shaped gear rack close to the first support pillar is provided with a rectangular block sliding inside the rectangular groove, a transverse part of the L-shaped gear rack is formed in a wedge shape, the placement board is provided with a limit sliding groove, a limit block is slidably connected inside the limit sliding groove of the placement board, the limit block matches with the transverse part of the L-shaped gear rack, an elastic component is fixedly connected between the placement board and the limit block, a tension spring is arranged between the rectangular block of the L-shaped gear rack and the placement board, the telescopic end of each linear actuator is fixedly connected to an unlocking plate, the unlocking plate matches with the limit block, the connecting shaft is rotatably connected to a gas chamber, the gas chamber is provided with an outer ring and an inner ring, the inner ring is provided with a hole that matches the outer ring, the inner ring of the gas chamber is fixedly connected to the transmission gear, and input ends of the first gas pipe and the second gas pipe are interconnected to the outer ring of the gas chamber.

2. The drilling device for coal mining according to claim 1, wherein an end of each pneumatic telescopic block close to the drill bit is formed in a triangular shape to reduce an accumulation of dust during the drilling process.

3. The drilling device for coal mining according to claim 1, wherein a frictional force between the first seal housing and the second seal housing is greater than a frictional force between the first seal housing and the connecting rod.

4. The drilling device for coal mining according to claim 1, wherein a diameter of the drilled hole drilled by the drill bit is greater than a diameter of an outer ring of the second seal housing.

5. The drilling device for coal mining according to claim 4, wherein an inner ring of the gas chamber that matches a connection between an outer ring of the gas chamber and the second gas pipe is formed in an arc-shaped groove.

6. The drilling device for coal mining according to claim 1, further comprising a replacement mechanism configured for switching the drill bit, wherein the replacement mechanism is arranged on two sides of the first support pillar and the second support pillar; the replacement mechanism comprises a first load-bearing plate, the first load-bearing plate is rotatably connected to the transmission rod, and the transmission rod is rotatably connected to a second load-bearing plate, the first load-bearing plate and the second load-bearing plate are symmetrically distributed; and the first load-bearing plate is fixedly connected to a first L-shaped connecting plate, the first L-shaped connecting plate is fixedly connected to a self-locking motor, and an output shaft of the self-locking motor is fixedly connected to the transmission rod.

7. The drilling device for coal mining according to claim 6, further comprising the explosive filling assembly, wherein the explosive filling assembly is configured to fill the hole with explosives, and the explosive filling assembly is arranged between the first support pillar and the second support pillar; the explosive filling assembly comprises a connecting cylinder, the connecting cylinder is provided with symmetrically distributed sliding grooves, two ends of the connecting cylinder are fixedly connected to the first support pillar and the second support pillar, the connecting cylinder is fixedly connected to a fixing ring, and the connecting cylinder is slidably connected to a moving ring; the fixing ring is rotatably connected to a second lead screw, the moving ring and the second lead screw are in threaded fit, the connecting cylinder is slidably connected to an explosive filling cylinder, and the explosive filling cylinder is provided with a sliding post that matches the sliding groove on the connecting cylinder; the first support pillar is fixedly connected to a second L-shaped connecting plate, the second lead screw is rotatably connected to the second L-shaped connecting plate, a first bevel gear is fixedly connected to the second lead screw, the second L-shaped connecting plate is rotatably connected to a rocker, the rocker is fixedly connected to a second bevel gear, and the second bevel gear meshes with the first bevel gear.

8. The drilling device for coal mining according to claim 7, wherein a length of the explosive filling cylinder is greater than a length of the connecting cylinder.

* * * * *